United States Patent [19]

Strobel et al.

[11] 4,256,774

[45] Mar. 17, 1981

[54] DECAFFEINATION PROCESS

[75] Inventors: Rudolf G. K. Strobel, Cincinnati; Richard A. Eich, Oxford, both of Ohio

[73] Assignee: The Procter & Gamble Company, Cincinnati, Ohio

[21] Appl. No.: 908,887

[22] Filed: May 24, 1978

Related U.S. Application Data

[63] Continuation of Ser. No. 814,619, Jul. 11, 1977, abandoned, which is a continuation of Ser. No. 681,869, Apr. 29, 1976, abandoned.

[51] Int. Cl.$^3$ ................................................. A23F 5/20
[52] U.S. Cl. ..................................................... 426/428
[58] Field of Search ................ 106/311; 426/428, 424, 426/429

[56] References Cited

U.S. PATENT DOCUMENTS

| 1,731,333 | 10/1929 | Davidson | 106/311 X |
| 3,477,856 | 11/1969 | Schultz | 426/424 |
| 3,682,648 | 8/1972 | Mitchell | 426/428 |
| 3,712,822 | 1/1973 | Meade | 426/429 X |

FOREIGN PATENT DOCUMENTS 167161  5/1934  Fed. Rep. of Germany ........... 426/428

OTHER PUBLICATIONS

R. Reiss, The Existence of Compounds Between Xanthamine Derviatives and Solubilizing Agents, Arzneimettel Forsch 11, #7, 669–671 (1971).

*Primary Examiner*—Joseph M. Golian
*Attorney, Agent, or Firm*—Eric W. Guttag; Rose A. Dabek; Richard C. Witte

[57] ABSTRACT

Coffee beans are decaffeinated using a solvent system which comprises benzyl alcohol.

15 Claims, No Drawings

DECAFFEINATION PROCESS

CROSS-REFERENCE TO RELATED APPLICATIONS

The present application is a continuation of application Ser. No. 814,619, filed July 11, 1977, now abandoned, which is a continuation of application Ser. No. 681,869, filed April 29, 1976, now abandoned.

BACKGROUND OF THE INVENTION

The present invention relates to a process for decaffeinating coffee beans. More particularly, coffee beans are decaffeinated using solvent systems which comprise benzyl alcohol. In a preferred mode, the benzyl alcohol is "thinned" with an organic solvent which promotes penetration of the benzyl alcohol into the beans. The process is preferably carried out in the absence of chlorinated hydrocarbon caffeine solvents.

A wide variety of solvent systems have been suggested for use in the decaffeination of coffee. For the most part, such solvents comprise either single-phase organic liquids or two-phase mixtures of an organic liquid and water. Other art-disclosed processes involve the use of elevated temperatures and pressures in conjunction with solvents to promote rapid dissolution of the caffeine and its extraction from the whole coffee beans.

A major problem with many potential decaffeination solvents is their ability not only to solubilize caffeine, but also to dissolve amino acids and sugars and remove them from the green coffee beans. Since the amino acids and sugars are the chemical precursors which develop the familiar coffee aroma and flavor during roasting, their removal by a decaffeination solvent is preferably avoided to the extent possible.

The chlorinated hydrocarbon solvents are currently being used by most producers of decaffeinated coffee since they are cheap, relatively volatile, and rather easily recovered, once appropriate plant facilities are built. While caffeine is not particularly soluble in the chlorinated hydrocarbon solvents, as compared with other types of solvents, the economic advantage of the chlorinated hydrocarbons must be presumed, since they are in such wide commercial use. Importantly, the chlorinated hydrocarbons leave sufficient quantities of the amino acid and sugar flavor precursors in the beans so that decaffeinated coffe beverages with adequate (but sub-optimal) flavor and aroma levels are secured.

The history of current government regulations indicates that there is some concern on the part of health care specialists regarding the use of chlorinated hydrocarbons to decaffeinate coffee. Residual levels of materials such as trichloroethylene have been judged to be intolerable in decaffeinated coffee beans and the use of this material as a decaffeination solvent has recently been brought into question.

As can be seen from the foregoing, it would be advantageous to be able to remove caffeine from coffee beans without the need for chlorinated hydrocarbon solvents. Moreover, it would be highly desirable to use, as a decaffeination means, a caffeine solvent which is generally recognized as safe (GRAS) for food use. The use of a GRAS material as a solvent to decaffeinate coffee would alleviate any concerns about untoward physiological effects on the users of decaffeinated products even if minor traces of the solvent were to remain in the decaffeinated coffee beans.

It has now been determined that solvent systems comprising benzyl alcohol (a GRAS material) are quite effective in removing caffeine from coffee beans. Moreover, use of the benzyl alcohol systems does not result in unacceptable losses of flavor precursors. Accordingly, the present invention provides a process for decaffeinating coffee beans which employs benzyl alcohol as a caffeine solvent.

PRIOR ART

The use of a variety of solvents to decaffeinate coffee beans is reported in the literature. For example, U.S. Pat. No. 1,629,512 (Kundig; 1927) teaches solvents such as benzene, carbon tetrachloride, and alcohols such as propyl alcohol, allyl alcohol, as well as esters of nitric acid, etc., for decaffeinating coffee beans.

U.S. Pat. No. 2,391,981 (1946; Kremers) discloses methyl alcohol, ethyl alcohol, acetone, amines, etc., for decaffeinating coffee beans.

U.S. Pat. No. 3,682,648 (1972; Mitchell, et al.) discloses the decaffeination of green coffee beans using solutions of various edible esters, such as the acetic acid esters of propylene glycol or glycerol. The beans are swollen with water to promote decaffeination.

Various United States, German, British, French and Belgian patents relate to various solvent systems used in decaffeination processes. In general, these solvents are aliphatic alcohols, acetone, various chlorinated hydrocarbons, tribasic acids, benzene, gasoline, etc. Among these are U.S. Pat. Nos. 950,357; 2,016,634; 2,324,594; 2,335,206; 3,749,584; 2,817,588; 1,000,692; German Pat Nos. 1,807,308; 1,492,744; 1,805,391; British Pat. Nos. 871,984; French Pat. Nos. 739,527; and Belgian Pat. Nos. 763,797.

The article by R. Reiss, entitled "The Existence of Complexes Between Xanthine Derivatives and Solubilizing Agents" appearing in Arzneimittel-Forsch, 11, #7, 669–71 (1971) reports data which are said to indicate the existence of complexes formed between caffeine and benzyl alcohol.

The solubility of caffeine in a wide variety of solvents has been reported in the literature. In the main, the solvent systems do not appear to be disclosed for use in decaffeinating coffee beans, but rather as part of a general investigation into the mode of drug action of caffeine and a variety of related compounds having interesting pharmacological/biological activities. For example, the text SOLUBILITIES OF ORGANIC COMPOUNDS, Seidell, Vol. 11, 1941, at page 613, describes the solubility of caffeine in a wide variety of organic solvents, including, for example, benzaldehyde.

The solubility of caffeine in several solvents, with-and-without additives such as sodium benzoate, appears in the Merck Index, 8th Ed. (1968) at page 188. Beilstein's Handbook also reports the solubility of caffeine in various solvent systems under the heading "KAFFEIN" (Beilstein 1937; 1938; 1954; see also the solubility of caffeine as reported in the HANDBOOK OF CHEMISTRY AND PHYSICS and the DICTIONARY OF ORGANIC COMPOUNDS.)

The solubility of caffeine and various xanthine materials is reported in multiple entries throughout CHEMICAL ABSTRACTS.

SUMMARY OF THE INVENTION

The present invention encompasses a process for decaffeinating coffee beans (or like materials such as cocoa beans, cola beans, tea, and the like) comprising contacting said beans with a solvent system comprising benzyl alcohol, and thereafter removing the beans from contact with the solvent system. As is common practice in coffee decaffeination procedures, the process herein is preferably carried out using green (unroasted) coffee beans, but roasted or semi-roasted coffee beans can also be used.

In a preferred mode, the solvent system comprises the benzyl alcohol and one or more organic liquid "thinners" which, together with the benzyl alcohol, form a homogeneous liquid mixture. The thinners employed herein cause the benzyl alcohol (which is a relatively viscous liquid) to penetrate the coffee beans, or the like, and remove the caffeine more efficiently. Surprisingly, even the thinners which, themselves, are not good caffeine solvents do not interfere with the removal of caffeine by the benzyl alcohol.

While many chlorinated organic liquids are miscible with benzyl alcohol and can be used as thinners in the instant process, it is preferred to use non-chlorinated organic liquids as the thinners, since the problem of chlorinated hydrocarbon residues in decaffeinated coffee is thereby totally avoided. Various hydrocarbons, including aromatics such as the xylenes, the liquid cycloalkanes, ethyl acetate, diethylether, the $C_1$-$C_4$ alcohols and acetone are all miscible with benzyl alcohol and can be used as the thinner. Cyclohexane and cyclopentane are highly preferred thinners for use in the present process.

It will be appreciated that the coffee beans and other beans which are decaffeinated by the instant process can be the whole beans or ground or comminuted beans. The term "beans" as employed in the specification and claims herein encompasses all such forms of the beans. The process is thereby distinguished from the liquid-liquid extraction of coffee and other caffeine-containing liquid beverage extracts disclosed in the concurrently-filed application of Strobel and Eich, entitled LIQUID EXTRACT DECAFFEINATION PROCESS, Ser. No. 681,632, filed Apr. 29, 1976. The present solid-liquid extraction process makes use of the previously unreported ability of benzyl alcohol to break the bonds presumed to exist between caffeine and the solid, cellulosic bean matrix and efficiently dissolve and remove the caffeine therefrom. The process is distinguished from the liquid-solid decaffeination of solidified caffeine-containing extracts of coffee, and the like, disclosed in the concurrently-filed application of Strobel and Eich, entitled DRY EXTRACT DECAFFEINATION PROCESS, Ser. No. 681,633, filed Apr. 29, 1976.

DETAILED DESCRIPTION OF THE INVENTION

The present invention employs benzyl alcohol ($C_6H_5CH_2OH$) as a decaffeinating solvent for use with coffee beans, and the like. The high solubility of caffeine and the low solubility of flavor precursors in benzyl alcohol make this solvent especially useful in decaffeination processes.

Benzyl alcohol, alone, can be used in the present process; however, it is a relatively viscous liquid which penetrates coffee beans rather slowly. Decaffeinating coffee beans with pure benzyl alcohol can be an unduly slow process. It has now been determined that, by diluting benzyl alcohol with an appropriate, miscible "thinner" solvent, a solvent system which rapidly penetrates the coffee beans and removes the caffeine is provided.

The process of this invention is carried out by contacting coffee beans, or the like, with the solvent system comprising benzyl alcohol for a time sufficient to effect removal of the caffeine to the degree desired. It will be appreciated that the contact time used will depend to some extent on the amount of caffeine originally present in the coffee beans, the ratio of beans:solvent system employed, the decaffeination temperature and pressure, and like factors well recognized in the decaffeination arts. In any event, an appropriate contact time can be determined without undue effort by the user of the process herein. Of course, the amount of caffeine removed from the beans can be readily estimated by quantitative analyses of the caffeine content of the coffee beans being treated and the caffeine content of the solvent system at various times during the extraction process.

The process herein can be carried out in either a continuous or batch-wise manner. The solvent system can be circulated through the green beans, for example in a column. A batch-wise procedure involves simply soaking the coffee beans in the solvent system, followed by draining. In a continuous mode, the solvent system can be sprayed onto the coffee beans traveling on a moving conveyor.

The process herein can be carried out at temperatures below or above the boiling point of the solvent system, or the components thereof. The boiling point of the solvent system will depend on the pressure employed in the process. The present process can be carried out using pressures in excess of atmospheric, but this is not necessary to achieve excellent decaffeination with the benzyl alcohol-based solvent systems. For most purposes, the present process is carried out at pressures of about 1-5 atmospheres. In general, temperatures in the range from about 20° C. to about 125° C. are employed.

Following contact of the coffee beans with the solvent system for a time sufficient to achieve the desired degree of decaffeination, the coffee is removed from contact with the solvent system. This can be done by simple draining, air evaporation, or centrifugation techniques.

At this point in the process, a finite quantity of the benzyl alcohol remains entrapped within the coffee beans. This benzyl alcohol can be removed from the beans by washing with a separate portion of the thinner solvent, or with any other suitable solvent for benzyl alcohol.

The residual portion of solvent remaining in the coffee beans after the washing step is then substantially completely removed from the beans by vaporization. (Alternatively, vaporization can be employed to remove the benzyl alcohol without the washing step, but this is relatively inefficient.) The vaporization can be carried out, for example, by placing the coffee beans in a vacuum. It is more preferable, however, to vaporize the residual traces of the solvent system by heating the coffee beans. Since it is not preferred herein to effect a roasting process until the solvent system is substantially completely removed from the beans, it is most preferred that this vaporization be carried out at temperatures substantially below coffee bean roasting temperatures.

The vaporization of the residual traces of solvent can be carried out by heating the beans with radiant heat or, more preferably, by passing hot, dry air over the decaffeinated beans.

The present process can be carried out using either "wet" or "dry" coffee beans. Coffee beans have a natural moisture content of 8%–12% by weight. In the "wet" process, the coffee beans are first hydrated and swollen by exposure to water to achieve a moisture content of about 40%. The pre-swelling of the coffee beans with water is thought to open the bean structure to allow more efficient penetration of the solvent system. The solvent system comprising the benzyl alcohol is also preferably adjusted to a moisture content of about 4% by weight (saturated). This prevents the solvent system from extracting moisture from the hydrated coffee beans.

The wet decaffeination process is carried out in the general fashion disclosed hereinabove and removes about 97% of the total caffeine in the coffee with a single pass (22 hours) through the solvent system.

Coffee beans can also be extracted using a "dry" process. In the dry decaffeination process, the coffee beans are not saturated with water, but are used at their normal moisture content. No water is added to the solvent system, although traces of water may be present therein, inadvertently.

As noted hereinabove, the solvent system employed in the present process to effect decaffeination of coffee beans, and the like, without removing undue quantities of the flavor precursor materials present in the beans comprises benzyl alcohol. The benzyl alcohol is most preferably used at a low viscosity which allows rapid penetration into the beans and efficient removal of the caffeine. The viscosity of the benzyl alcohol is most preferably adjusted by means of an appropriate solvent. However, the viscosity of benzyl alcohol can also be lowered by increasing the temperature of the extraction process such that the need for additional thinner solvent is obviated. Accordingly, the process can be carried out using benzyl alcohol, alone, as the decaffeination solvent.

In the highly preferred process, however, the benzyl alcohol is thinned with an organic liquid which is miscible with the benzyl alcohol and forms a homogeneous, single-phase solvent system therewith. The solvent thinner for the benzyl alcohol need not be a solvent for caffeine, although thinners which are also solvents for caffeine are not excluded from the practice of this invention. For example, ethyl acetate, which is a relatively good solvent which has been suggested for use in extracting caffeine from coffee beans, is miscible with benzyl alcohol and is useful for adjusting the viscosity of the benzyl alcohol in the manner of the present process.

A variety of common organic solvents are not useful as the thinner herein, inasmuch as they do not form a homogeneous mixture with benzyl alcohol. For example, solvents such as benzene, hexane, heptane, and petroleum ether are not suitable for use as a thinner for the benzyl alcohol.

Representative examples of materials which do form a homogeneous solution with benzyl alcohol and which are useful herein include the xylenes, ethyl acetate, cyclopentane and cyclohexane.

The second consideration with the choice of thinner solvent relates to the solubility of amino acid and/or sugar flavor precursors therein. Of course, it is highly preferred to use thinners which do not substantially dissolve and remove such materials from coffee beans. Cyclopentane, cyclohexane and the xylenes (ortho, meta, para and mixtures) are useful in this regard, with cyclopentane and cyclohexane being especially preferred.

In a typical wet process for preparing decaffeinated coffee beans in the manner of this invention, the coffee beans are first contacted with water or water vapor to provide hydrated beans; the hydrated beans are thereafter contacted with the solvent system comprising benzyl alcohol for a time sufficient to remove the desired amount of caffeine; the beans are thereafter removed from contact with the solvent system; the beans are washed with a solvent for benzyl alcohol (preferably the washing solvent is cyclopentane, cyclohexane, one or more of the xylenes, or mixtures thereof); and, thereafter, residual amounts of the solvent system are removed from the coffee beans by vaporization (preferably by blowing 100° C. dry air over the beans). Decaffeinated, substantially solvent-free unroasted or semi-roasted coffee beans are then fully roasted using standard roasting techniques, whereby decaffeinated, roasted coffee is secured.

In the dry process herein, unhydrated coffee beans (i.e., coffee beans containing their "natural" moisture content) are contacted with the solvent system comprising benzyl alcohol for a time sufficient to remove the desired amount of caffeine; the coffee beans are thereafter removed from contact with the solvent system; the beans are then washed with the solvent for benzyl alcohol in the same manner as in the wet process disclosed above; and residual amounts of the solvent system are removed from the coffee beans, as in the "wet" process. The beans are roasted prior to use.

Mixed solvent systems herein generally comprise a mixture of benzyl alcohol and a thinner at a weight ratio in the range from about 10:90 to about 90:10. Preferred mixed solvents are those wherein the benzyl alcohol and thinner are used at a weight ratio of benzyl alcohol:thinner in the range from about 70:30 to about 60:40. Highly preferred solvent systems herein comprise benzyl alcohol/cyclohexane and benzyl alcohol/cyclopentane at a weight ratio of benzyl alcohol:cycloalkane in the range from about 70:30 to about 60:40.

As disclosed hereinabove, the present process can be carried out at any desired temperature commensurate with the boiling point of the solvent system. However, it is preferred, and convenient, to perform the process at a temperature in the range from about 40° C. to about 60° C.

In the batch-wise process, the time for the extraction of the caffeine will vary, depending on the factors discussed hereinabove. For most purposes, the contact time between the coffee beans and solvent system will be in the range from about 1 hour to about 24 hours, although shorter times can be used, especially when fresh solvent is continuously passed over the beans as, for example, in a column.

In the batch-wise process, the weight ratio of the solvent system to coffee beans is generally in the range from about 1:1 to about 20:1, with 10:1 being average.

The following examples are intended to illustrate both the dry and the wet processes for decaffeinating coffee beans in the manner of this invention, but are not intended to be limiting thereof.

In particular, the organic thinner solvents specifically disclosed in the following examples are not intended to be limiting of such materials in the present process. Other organic liquids which are miscible with benzyl alcohol and are suitable for use as the thinners herein include: pyridine, acetic acid, 1-butanol, ethylene glycol, 2-nitropropane, 1-nitropropane, n-butyl acetate, toluene, nitroethane, nitromethane, benzaldehyde, acetone, acetonitrile, ethyl ether, and isopropyl acetate.

EXAMPLE I

Green coffee beans are hydrated to a moisture content of 40% by weight by storage overnight in a 60° C. room at 100% relative humidity. The hydrated beans are then used in the extraction process.

A solvent system comprising 60% by weight benzyl alcohol, 40% by weight cyclohexane and 4% water is prepared by simply admixing the liquids.

The hydrated coffee beans and solvent system are placed together in a container (conveniently, a rocking autoclave or like container). The weight ratio of solvent system to beans is 10:1. The container is charged with 75 psi nitrogen, sealed, and heated to a temperature of ca. 50° C. The beans are allowed to remain in contact with the solvent system for ca. 22 hours. At the end of this period, the system is cooled, the solvent is drained off, and the wet beans are washed with cyclohexane to remove residues of benzyl alcohol. The residual cyclohexane is then removed from the beans by passing 100° C. dry air over the beans.

Analysis of the coffee beans (original caffeine content 1.6% by weight) treated in the foregoing manner indicates that ca. 97% of the original caffeine is removed.

In the process of Example I, the beans are coarsely ground prior to extraction. Excellent decaffeination using the benzyl alcohol/cyclohexane solvent system is achieved.

EXAMPLE II

The process of Example I is repeated, but with no pre-hydration of the green beans and without the addition of water to the solvent system. After contact with the solvent system for 22 hours, as much as 92% by weight of the original caffeine is removed from the beans.

In the process of Example II, the 60:40 benzyl alcohol:cyclohexane solvent system is replaced by an equivalent volume of 70:30 benzyl alcohol:cyclohexane as a solvent system and substantially equivalent results are secured.

Coffee beans decaffeinated in the manner of Example I and Example II are tested for amino acid and sugar flavor precursors. Very little of the flavor precursor materials are lost during the benzyl alcohol decaffeination. The dry bean decaffeination of Example II tends to remove less flavor precursor materials from the beans than does the wet decaffeination process of Example I.

Coffee beans decaffeinated in the manner of Example I and Example II are roasted using standard equipment to a photovolt reading in the range of 60–80, i.e., a "standard" roast color typical of commercial products. Coffee brewed from the roasted beans has flavor and aroma characteristics comparable with, or superior to, coffee brewed from beans which have been decaffeinated with chlorinated hydrocarbon solvents.

EXAMPLE III

Coffee beans are roasted to a photovolt reading in the range of 60–80 and then decaffeinated following the procedure of Example II. An excellent, decaffeinated coffee beverage is prepared from the beans.

EXAMPLE IV

Coffee beans are semi-roasted by heating for ca. 20 minutes at 200° C. This semi-roasting "fixes" the flavor precursors and helps prevent their loss during decaffeination. The beans are cooled and decaffeinated following the procedure of Example I. After a final roast to a photovolt reading of 60–80, the beans yield an excellent, aromatic, decaffeinated coffee beverage.

EXAMPLE V

Following the procedure of Example II, green tea, black tea, green cocoa beans and green cola nuts are, respectively, decaffeinated by contact with a 50:50 (wt.) mixture of benzyl alcohol and cyclohexane.

The decaffeinated materials prepared in the manner of Examples I–V above can optionally be combined with flavor concentrates which can be prepared in the manner disclosed in U.S. Pat. No. 3,717,472, Strobel, issued Feb. 20, 1973, and in U.S. Patent Application Ser. No. 330,143, filed Feb. 6, 1973, Strobel, entitled STABLE AROMA, FLAVOR AND AROMA FLAVOR PRODUCTS FROM AROMA- AND FLAVOR-BEARING SUBSTRATES, the disclosures of which are incorporated herein by reference. The resulting decaffeinated beans are thereby enriched and fortified to provide decaffeinated products of excellent flavor and aroma.

It will be appreciated that the benzyl alcohol solvent system used herein not only decaffeinates coffee, cocoa, and the like, but also serves concurrently to remove other xanthine-like materials therefrom. Accordingly, the term "decaffeinate" as used in the specification and claims herein encompass the removal of these other xanthine materials (e.g., theobromine, theophylline, etc.).

What is claimed is:

1. A process for decaffeinating green coffee beans, comprising:
   hydrating the beans;
   contacting the hydrated beans with a solvent system which comprises a decaffeinating amount of benzyl alcohol; and
   thereafter removing the decaffeinated beans from contact with the solvent system.

2. A process according to claim 1 wherein the solvent system is moisture saturated.

3. A process according to claim 2 wherein said contacting step is carried out at a temperature of from about 20° to about 125° C.

4. A process according to claim 3 wherein the solvent system further comprises a benzyl alcohol thinner selected from the group consisting of cyclopentane, cyclohexane, the xylenes and mixtures thereof, in an amount sufficient to increase the decaffeination effectiveness of the benzyl alcohol.

5. A process according to claim 4 wherein the ratio of benzyl alcohol:thinner is from about 70:30 to about 60:40 by weight.

6. A process according to claim 5 further comprising the steps of washing the decaffeinated beans with a separate portion of the thinner and thereafter removing residual amounts of the solvent system from the decaffeinated beans by vaporization.

7. A process according to claim 5 wherein said contacting step is carried out at a temperature of from about 40° to about 60° C.

8. A process according to claim 7 wherein said contacting step is carried out in a batch-wise fashion and wherein the ratio of solvent system:beans is from about 1:1 to about 20:1 by weight.

9. A process for decaffeinating green coffee beans comprising the steps of:
   (a) hydrating the beans;
   (b) contacting the hydrated beans with a moisture saturated solvent system which comprises a decaffeinating amount of benzyl alcohol and a benzyl alcohol thinner selected from the group consisting of cyclohexane, the xylenes and mixtures thereof in an amount sufficient to increase the decaffeination effectiveness of the benzyl alcohol; and
   (c) thereafter removing the decaffeinated beans from contact with the solvent system.

10. A process according to claim 9 wherein the ratio of benzyl alcohol:thinner is from about 70:30 to about 60:40 by weight.

11. A process according to claim 10 wherein the thinner is cyclohexane.

12. A process according to claim 10 wherein the thinner is the xylenes.

13. A process according to claim 10 further comprising the steps of washing the decaffeinated beans with a separate portion of the thinner and thereafter removing residual amounts of the solvent system from the decaffeinated beans by vaporization.

14. A process according to claim 13 wherein said contacting step is carried out at a temperature of from about 40° to about 60° C.

15. A process according to claim 14 wherein said contacting step is carried out in a batch wise fashion and wherein the ratio of solvent system:beans is from about 1:1 to about 20:1 by weight.

* * * * *